United States Patent [19]

Johnson et al.

[11] 3,852,814

[45] Dec. 3, 1974

[54] MAGNETIC TAPE RECORDING AND/OR REPRODUCING APPARATUS HAVING MEANS TO RELOCATE A PREVIOUS TERMINATION OF RECORDING OR REPRODUCING

[75] Inventors: Delmar R. Johnson, Barrington, Ill.; Rickard J. Elkus, Jr., Atherton, Calif.

[73] Assignee: Ampex Corporation, Redwood City, Calif.

[22] Filed: Oct. 31, 1972

[21] Appl. No.: 302,517

[52] U.S. Cl. .......................... 360/72, 360/84, 360/95

[51] Int. Cl. ....................... G11b 15/02, G11b 19/18

[58] Field of Search ............ 179/100.2 S, 100.1 VC, 179/100.2 B; 360/72

[56] References Cited

UNITED STATES PATENTS 2,536,666 1/1951 Somers ...................... 179/100.1 VC 3,728,494 4/1973 Kobler et al. ................ 179/100.2 S

*Primary Examiner*—Raymond F. Cardillo, Jr.
*Assistant Examiner*—Robert S. Tupper

[57] ABSTRACT

A magnetic tape recording and/or reproducing apparatus is provided with means to automatically mark a spot on the tape when a playback or recording selector means is operated to interrupt a recording or reproducing operation and a selector means is operated to wind the tape on a reel in one direction. With a subsequent operation of a fast forward or rewind selector means, the tape may be fed at a fast speed in the opposite direction while a means automatically searches for the mark on the tape; and, upon detecting the mark, means are operated to halt the tape travel so reproducing or recording may be resumed at the point of previous termination.

8 Claims, 5 Drawing Figures

MAGNETIC TAPE RECORDING AND/OR REPRODUCING APPARATUS HAVING MEANS TO RELOCATE A PREVIOUS TERMINATION OF RECORDING OR REPRODUCING

This invention relates to a magnetic tape recording and/or reproducing apparatus having manually operable play/record selector means for causing a playback or recording operation, a fast forward selector means for causing fast tape transport in a forward direction, and a rewind selector means for causing fast tape transport in a reverse direction.

When operating an audio or video magnetic tape recording and/or reproducing apparatus, a recording or reproducing operation is often terminated and the tape rewound either partially or fully. Then, subsequently, it is desired to relocate the spot on the magnetic tape of previous termination quickly and automatically.

Although it is possible to visually ascertain the extent that the reproduction or recording has occurred, as by noting the footage transported prior to terminating a playback or recording operation, this involves a manual operation. This manual operation may be the occasion of error such as a wrong notation for the spot, subsequent loss of the notation, or misinterpretation of the notation. Moreover, the manual relocating task of observing the tape transport for the noted footage is considered by some to be time consuming and unnecessary.

The present invention is of particular utility in a video tape recording and/or reproducing apparatus, hereinafter referred to as a video tape recorder, of the kind disclosed in copending patent application Ser. No. 66,253 entitled Magnetic Tape Apparatus filed Aug. 24, 1970, now U.S. Pat. No. 3,691,315; but the invention is not to be construed as limited to video tape recorders or to the particular recorder described herein in detail. Video tape recorders such as disclosed in the above-mentioned application transport a video tape from a supply reel to a take-up reel permanently secured within the recorder. Therefore, when one terminates playback or recording and desires to remove the supply reel from the apparatus, one is required to operate a rewind selector means to rewind the magnetic tape completely onto the supply reel. When it is desired to resume playback or recording at the spot of last playback or recording, the supply reel must be reinserted into the apparatus and a fast forward selector means operated to cause tape transport forwardly to the spot of last playback or recording. This is in contrast to apparatus operable with magnetic tape cassettes or cartridges in which operation may be terminated at any point and the cartridge or cassette removed without rewinding the tape onto the supply reel.

The present invention is also however useful for playback and/or recording apparatus which use cassettes or cartridges as many times the operator will want to terminate at a given spot, transport the tape forwardly or reversely for a review, and then subsequently return to the given spot. Thus, the invention may be used in reel-to-reel, cartridge, or cassette kind of audio or video magnetic tape apparatus.

Accordingly, an object of the present invention is to provide a magnetic tape recording and/or reproducing apparatus of the foregoing kind with the capability of automatically marking the spot of termination of reproduction or recording and automatically relocating the spot subsequently for resumption of a playback or recording operation at that spot.

Other objects and advantages of the invention will become apparent from the following detailed description taken in connection with the accompanying drawings in which.

Figure 1:
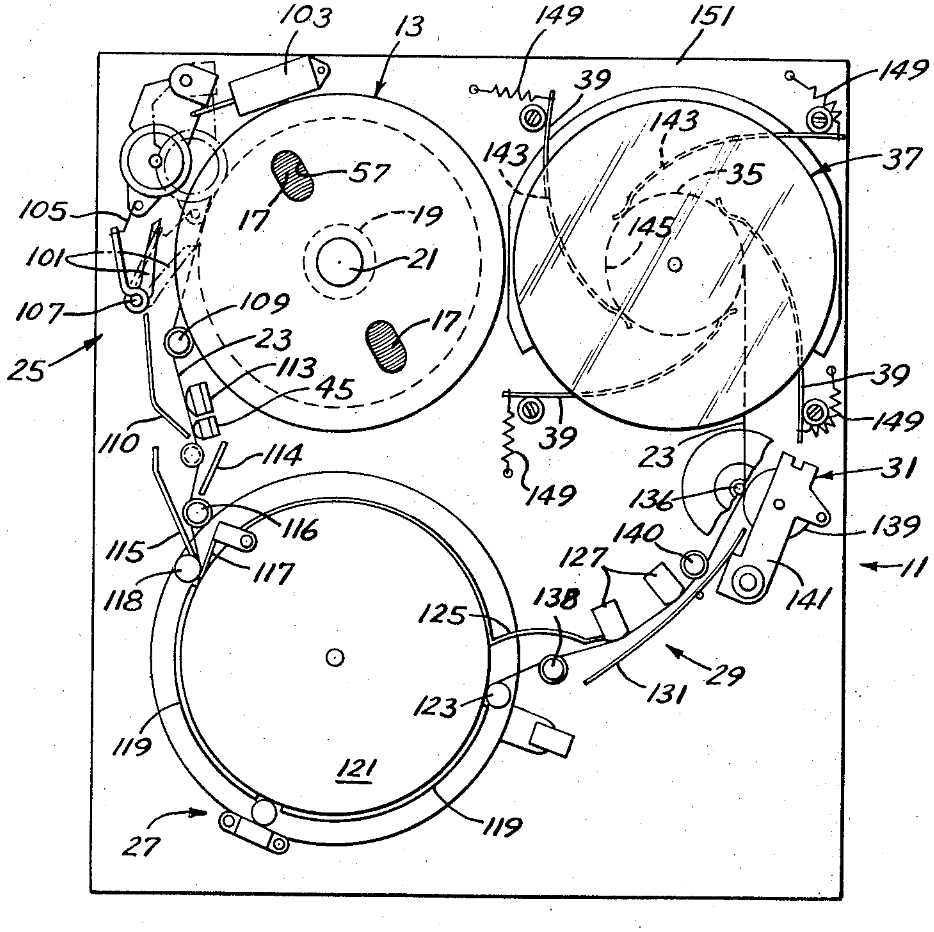
FIG. 1 is a partial plan view illustrative of a video tape recording and reproducing apparatus embodying the invention.

As shown in the drawings for purposes of illustration, the invention is embodied generally in a reel to reel tape recorder 11 having a supply reel 13 on which is carried a coil 15 of video tape 17. The supply reel 13 will hereinafter be referred to as a cartridge, as in the above-identified patent application it is referred to as a cartridge. The cartridge 13 is generally circular and includes a central hub 19 which is apertured to be seated on a rotatable, motor driven spindle 21 of the apparatus 11. The operator merely places the cartridge 13 onto the spindle 19 and initiates a self-threading operatiton in which a tape leader 23 secured to the leading end of the tape is fed by a threading means 25 automatically past a scanner assembly 27 and the audio head means 29 to a capstan drive means 31 and onto a hub 35 of a take-up reel 37. At the take-up reel 37 spring bias followers 39 urge the leader 23 to wind about the hub 35. During a recording operation or during a playback operation, the tape transport, which includes the motor drives for the hubs 19 and 35 as well as the motor drive for the capstan means 31, transports the tape at a first predetermined velocity, for example, 7.5 inches per second (i.p.s.) to feed the tape forwardly, i.e., to unwind the tape from the supply cartridge 13 and to wind the tape on the take-up reel 37.

When it is desired to terminate a playback or recording operation and to rewind the tape onto supply cartridge 13, the operator will operate an appropriate push button selector to stop the forward tape transport; and then operate a rewind sector means 41 (FIG, 3) to cause the tape transport to transport the tape in a reverse direction at a velocity many times faster than operational velocity. In order to locate the point of termination of playback or recording in order to resume operation at the point of previous termination, heretofore the operator had to read a footage counter and to manually record the tape length unwound from the supply reel 13. However, such footage notations may be recorded inaccurately, lost or misinterpreted causing difficulty in returning to the location desired. Also, coast of the take-up reel after rewind of the cartridge will add error to the counter reading.

Figure 2:
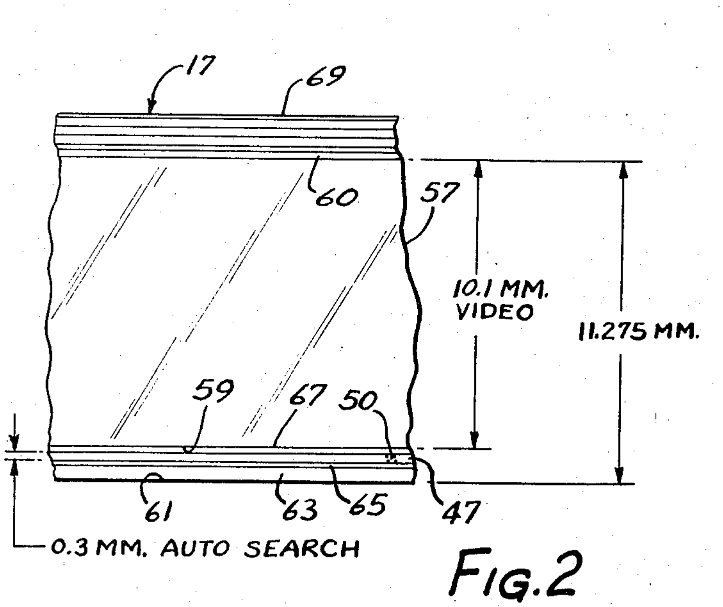
FIG. 2 is an enlarged diagrammatic view of a video tape having an auto search track thereon.
Figure 2A:
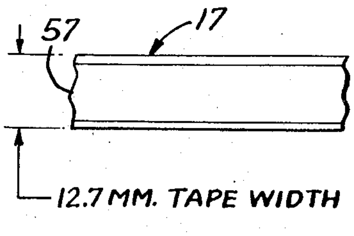
FIG. 2A is a reduced size view of the tape of FIG. 2.

In accordance with the present invention, an automatic marking and return to the location of a previous termination in play or recording may be achieved in a magnetic tape playback or recording apparatus by terminating a playback or recording operation, transporting the tape at high speed in one direction and subsequent transporting the tape at high speed in the opposite direction. In the illustrated recorder 11, upon reinsertion of the supply cartridge 13 onto the video tape recorder 11, a fast wind selector means 43 (FIG. 3) may be operated to activate a fast forward control to thereby cause the tape to transport forwardly at the fast velocity. As the tape is moved at a high speed, it is searched for a location signal previously placed thereon at the spot at which playback or recording was terminated. In this instance, a sensing means in the form of a transducer head 45 searches a narrow longitudinal track 47 (FIG. 2) on the video tape 17 traveling past the same until a location signal 50 is located upon which sensing the transducer head 45 causes a sensing circuit 53 to deactivate the fast forward control and thereby halt further tape travel. The stopping is thus automatic. In the preferred embodiment of the invention, operation of a play record selector means 55 (FIG. 3) operates an erasing means in the form of a D.C. current source to automatically erase the location signal 50 from magnetic tape when play or recording is resumed. Thus, the tape may be used repetitively without previous location signals causing problems in unwanted stoppings of tape transport.

The marking of the location of termination is also automatic in the sense that the operator does not have to operate any particular means to cause the location signal 50 to be formed on the video tape 17 but need merely operate the rewind selector means 41, in this first embodiment of the invention, to rewind the tape onto the supply cartridge 13. Several manners of making the location signal 50 will be described in detail hereinafter.

Referring now in greater detail to the illustrated embodiment of the invention, the video tape recorder 11 illustrated in FIG. 1 is of the kind disclosed in the aforementioned co-pending application Ser. No. 66,253, filed Aug. 24, 1970, which is hereby incorporated as if fully reproduced herein. Hence, this video tape recorder is only generally described herein.

The illustrated tape supply cartridge 13 carries the coil 15 of video tape thereon and secured to the leading end of the magnetic tape is the tape leader 23 which is of a more rigid, stiffer material than the video tape. The tape leader 23 is retained within the cartridge 13 so that the same will not fall or uncoil from the reel or cartridge when the same is handled, shaken, vibrated or otherwise manipulated prior to or after use with the video tape recorder 11. In this instance, the tape leader is retained between spaced flanges 57 of the cartridge by reason of the fact that it is wider than the usual one-half inch for the tape and its width is related to the distance between flanges so that it will be gripped or wedged therebetween until it is automatically peeled to cause the same to thread through the apparatus.

A conventional video tape 17 usable with the video tape recorder 11 may have a tape format about to be described, the format being standardized with precise locations across the width of the magnetic tape being allocated for specific purposes. For example, the tape 17 has a central video track 57 of approximately 10.1 millimeters in width on which track is recorded the video signals. In this instance, the video track 57 has a first longitudinally extending margin or edge 59 with its opposite edge 60 being located 11.275 millimeters from one side edge 61 of the video tape. Disposed adjacent the tape's side edge 61 and extending inwardly therefrom for 5 millimeters is a control track 63. Next to the control track is a guard ban track 65 of approximately 0.15 millimeters in width. Next to this guard ban track 65 is an audio receiving portion of the tape format but which is herein used as the auto search track 47 on which the location signals are recorded. The auto search tract 47 is 0.3 millimeters in width and is contiguous to an overscan track 67 of 0.225 millimeters in width.

Briefly, on the opposite side of the video tape 17 and extending inwardly in sequential order from tape side edge 69, there are as follows: a guard ban track of 0.05 millimeters width, an audio track of 0.35 millimeters width, a guard ban track of 0.3 millimeters width, an audio track of 0.35 millimeters width, a guard ban track of 0.15 millimeters width and an overscan track of 0.225 millimeters width to edge 60 of the video track 57. It will be appreciated that the location and size of the search track 47 and the other tracks illustrated are by way of example only and not by way of limitation as to the position or the size of the search track used with the invention. That is, other tape format with other locations for a search track than that illustrated herein may be used with the present invention.

The preferred embodiment of the invention will now be described in connection with the illustration of FIG. 3. Assuming a video tape playback or recording operation is terminated intermediate the ends of tape 17, the operator will actuate the rewind selector means 41, which comprise a push button 70 and a suitable relay 72 by depressing the push button; and this will cause a signal generator 71 to be operatively connected to the auto search transducer head 45 to apply a signal to the tape at the search track 47. In this instance, an alternating current signal from the signal generator 71 is applied by the transducer head 45 to the search track 47 of the video tape 17. Via a timing circuit 73 this AC signal is connected to the auto search head 45 for only a short time, e.g. approximately one second, during the start of rewind. After this a DC erase signal is connected to the head 45 until the rewind function is terminated to assure erasure of any previously recorded location signals 50. Thus, the only one location signal 50 will be present on the tape in the segment being rewound.

Figure 3:
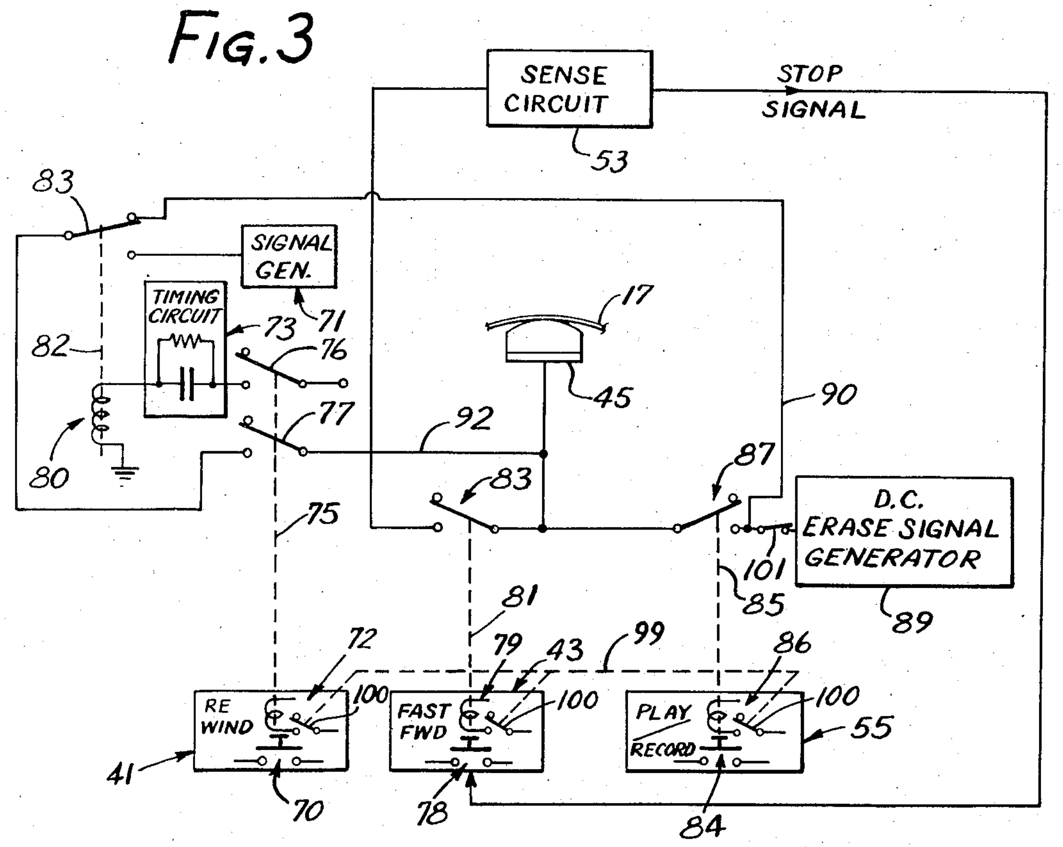
FIG. 3 is a block diagram illustration of a system for automatically marking and locating a spot of previous termination with the apparatus of FIG. 1.

Referring to FIG. 3, operation of the push button 70 of the rewind selector means 41 causes the relay 72 to move its actuator 75 to close switch means 77 to connect the auto search head 45 momentarily to signal generator 71 via timing relay 80 which then times out and connects the auto search head to the DC erase signal. More specifically, the push button 75 closes switch means 76 to energize timing circuit relay 80 which operates actuator 82 to swing a contact 83 to connect signal generator 71 through a lead including now closed contact 77 to the transducer head 45. After about one second of recording of a location signal 50, the timing circuit 73 times out and timing relay 80 deenergizes and returns contact 83 to connect DC erase signal generator 89 through lead 90 and contact 77 to the transducer head 45. After rewinding of the video tape 17 and leader 23 into the cartridge 13, the push button 70 automatically releases causing the rewind selector means 41 to open relay switch means 77 which opens lead 92 extending to the transducer head 45. Usually, the operator will remove the tape supply cartridge 13 from the apparatus 11.

At some subsequent time, the operator may want to resume playback or recording at the same spot of previous termination as located by the signal 50. The operator will again place the same cartridge 13 on the hub 21. By then operating a push button 78 of the fast forward selector means 43, the tape transport including the capstan drive means 31 transports the tape forwardly at the faster speed with the auto search head 45 searching the auto search track 47 for the location signal 50. More particularly, operation of the fast forward selector means 43 operates relay 79 to move its actuator 81 to close switch means 83 to connect a sensing circuit 53 to the auto search head 45. When the location signal 50 is sensed by the transducer head 45, the sensing circuit 53 is operated to produce a signal output which causes the fast forward selector means 43 to disable the capstan drive means 31 and the motor drives for the cartridge 13 and take-up reel 37 and halt further travel of the tape. The spot of the last playback or recording will be closely adjacent the scanning assembly.

For systems in which the tape tracking or head-to-tape contact is not carefully controlled to eliminate air bearings, the erasure by the DC signal in a rewind operation may not have been perfect; and hence it may also be desirable to erase any old location signals 50 on the track 47 during a subsequent playback or record operation. To these ends, it is preferred that a subsequent operation of the play/record selector means 55, as by depressing push button 84, operates relay 86 to shift actuator 85 to close switch means 87 to connect erase signal generator 89 to the auto search head and its signal output effectively erases any old location signals 50 further into the reel.

Figure 4:
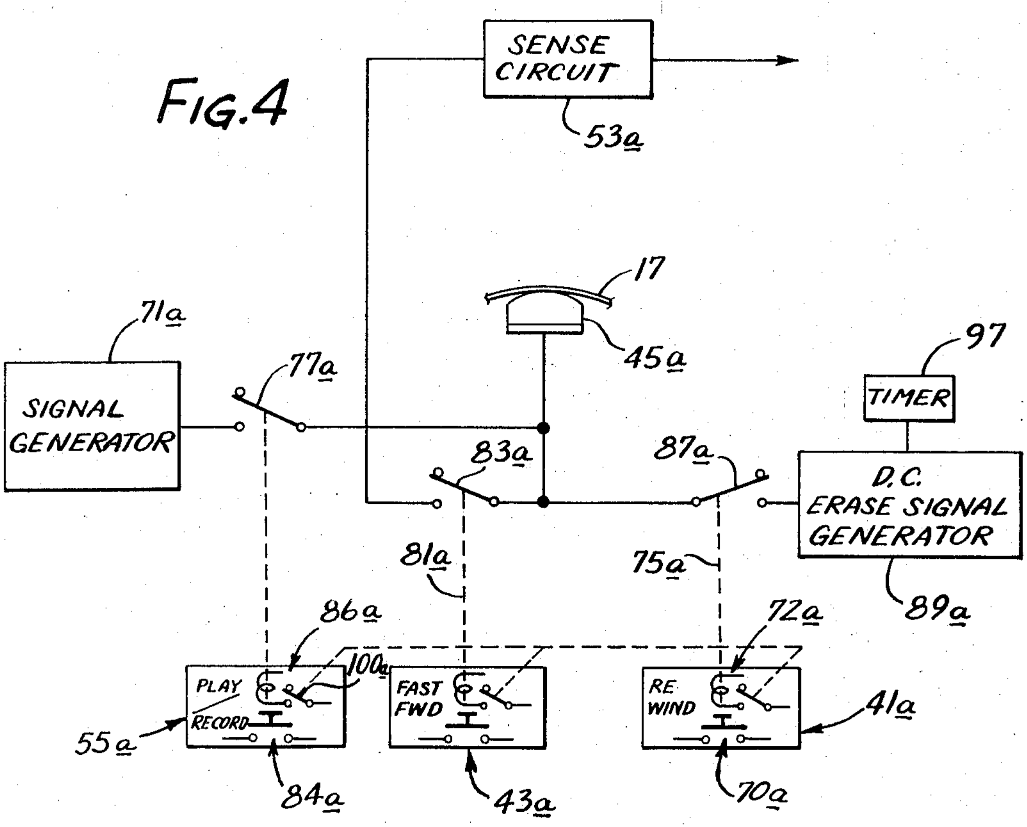
FIG. 4 is a block diagram illustration substantially similar to that of FIG. 3 but illustrating a further embodiment of the invention.

A further embodiment of the invention will now be described in connection with FIG. 4 and similar reference characters with a subscript *a* will be used to refer to elements described above and previously designated by the same reference characters. In this embodiment of the invention, operation of the push button **84*a* of the play/record selector means 55*a* operates relay 86*a* to shift actuator to close a switch means 77*a* and thereby connected a continuous signal output from the signal generator 71*a* to the transducer head 45*a* to be applied to the auto search track 47 for the length of tape 17 being transported during playback or recording. In this embodiment of the invention, the signal generator 71a does not have a timer such as the timer 73** controlling it.

When the playback or recording operation is terminated intermediate the tape ends and the tape is to be rewound, the operator will operate push button **70*a* of the rewind selector means 41*a* to cause the tape transport to transport the tape in the reverse direction and at high speed. Also, the rewind relay 72*a* is operated and shifts its actuator 75*a* to close a switch means 87*a* to connect the erasing means in the form of a D.C. erase signal generator 89*a* to the auto search head 45*a*. The erase signal generator 89*a* is controlled by a timer 97 which provides a slight time delay or pause before the generator applies an erase signal to the transducer head and through the latter to the tape. During this time delay, the tape will transport for a short length without the signal thereon being erased therefrom and this results in a short length location signal 50 on the tape since the remainder of signal on the search track 47 will be erased. For example, after a one second time elapse, the timer 97 will time out and allow the signal generator 89a to apply the direct current erase signal to the search track 47** for the remainder of the rewind tape transport.

When it is next desired to resume playback or recording at the location of previous termination, the fast forward selector means **43*a* (FIG. 4) may be operated to cause the tape to transport forwardly at high speed. Simultaneously, actuator 81*a* closes switch means 83*a* to connect the auto search head 45*a* to the sensing circuit 53*a*. When the sensing head detects the location signal 50 on the search track 47, the sensing circuit 53*a* operates the fast forward selector means 43*a*** to disable the tape transport and the tape travel will terminate at about the location of previous termination of playback or recording.

A brief description of the video tape recorder illustrated in FIG. 1 will now be given.

For the purpose of peeling the leading end of the leader 17 from the tape cartridge 13 when it initially turns, there is provided a pointed finger 101 for movement upon operation of a solenoid 103, which is connected through a spring 105 to the finger, to pivot the finger about a pivot post 107. With operation of the solenoid 103, the finger shifts its pointed free end from an inoperative position spaced from the cartridge and leader 23 to an operative position in which the free end engages the tape leader and peels its leading end from the reel flanges 57 during initial reel rotation in the unwinding direction, which is in a counter-clockwise direction as viewed in FIG. 1. As the supply cartridge 13 continues to turn, the leading end of the leader 23 is guided to travel between a guide roller 109 and a guide plate 110 and on past a video control transducer 113 and an adjacent auto search head 45 which is positioned immediately upstream of the scanner assembly 27. From the search head 45 the leader's leading end will be deflected by a guide 114 to the left side of an idler post 115 to enter a throat formed between guides 115 and 117. The latter cooperate to channel the leader end past a post 118 and into the inlet of a curved guide 119 which is arcuate and spaced circumferentially from but closely adjacent to a rotating circular scanning drum 121 of the scanning assembly 27. The scanning drum 121 carries two video heads spaces 180° apart for travel into and from engagement with the traveling tape. The scanning assembly also comprises a lower stationary drum with the leader and subsequently the tape being wrapped in a so-called spiral wrap for at least 180° in this instance, about the scanning assembly drums.

The leading end of the tape leader 23 exits the curved guide 119 at a guide post 123 and then is deflected by a curved guide 125 to travel between audio transducer head 127 and audio head 129 and a guide chute 131. The guide chute 131 directs the leading end of the leader 23 into the nip of the tape driving capstan means 31, the latter including a motor driven capstan 136 and a cooperating pinch roller 139 which is carried on a pivotally mounted bracket 141 for pivoting to establish a driving nip with the capstan 136. At this time the leader will then be taut between guide posts 138 and 140 and about the audio transducer heads 127 and 129. The audio search head 45 may be positioned in various locations such as adjacent the audio head 127. In this instance, the search head 45 is placed before the scanner assembly 27 rather than after it.

When the leading end of the leader 23 is threaded into the nip of the capstan drive means 31, the means for turning the supply cartridge 13 and for feeding of the leader may be disabled with the tape and leader being transported only by the capstan 136 and pinch roller 139 so as to provide a tension and tape transport speed which approximate that occurring during a playback or recording operation. From the nip at the capstan 136, the leading end of the leader travels forwardly to abut an arcuate guide follower 39 which deflects the leader onto a friction surface 145 of the rotating hub 35 for the take-up reel means 37.

Preferably, a series of identical arcuate guide followers 39 are spaced equidistantly about the hub with each having the same construction. More specifically, the guide followers 39 have a curved spring leaf portion 143 having a free end for riding on the rotating hub 35 or for riding on the outermost coil of tape 17 on the hub 35. The curved outer free ends are biased against the hub 35 by means of contractile tension springs 149 which are fastened at opposite ends to a stationary support plate 151 and fastened at opposite ends to the guide followers 39. The surface 145 of the take-up hub 35 is preferably a high coefficient of friction kind of surface, such as rubber or vinyl which will hold the leader without its slipping when forced there against by the spring guide followers 39. As the leading end of the leader 23 is engaged successively by the followers 39, it begins to coil about the hub 35. The leader may be about two feet in length and is wound several times about the hub 35 prior to the tape 17 being moved into the nip of the capstan drive means 31 and being positioned for a playback or recording operation. At this time, the apparatus automatically stops feeding, and it requires an operation of the play record selector means 55 to begin playback or recording.

It will be apparent from the foregoing that operation of the rewind selector means 41 reverses the direction of rotations of the supply cartridge and take-up reel and that the tape will unwind and the leader 23 will unwind from the take-up reel and return through the various guides to wind on the supply cartridge 13 with the leading end of the tape gripped between the flanges of the cartridge.

It is to be understood that the magnetic tape 17 need not be completely rewound and removed from the apparatus in order to relocate the point of previous termination. If the operator stops the rewind operation prior to winding all of the tape 17 and then, subsequently, operates the fast forward selector means 43 or 43*a*, the search for the spot of previous termination will be initiated and the fast forward tape transport will continue until the marked spot is located by the search head 45. Rewind of the tape short of a complete rewind will occur more often when the tape is carried in a cassette or cartridge because it is not necessary to rewind the tape prior to removal of the cassette or cartridge from the apparatus. Usually, the tape rewind operation for a cassette or cartridge using apparatus is for the purpose of review of an earlier recording or playback as the cartridge or cassette may be removed from the recording and/or playback apparatus without any rewinding of the tape.

With the illustrated embodiment of the invention, the permanent attachment of the take-up reel 37 to the recorder practically assures that the initiation of the sensing operation will be with operation of the fast forward selector means 43 and 43*a*. However, with other playback or other recording apparatus (not shown) in which the take-up reel may be removed from and placed onto a spindle with a full coil of tape thereon, the connection of the auto search head to the sensing circuit 53 may be desirably made upon operation of a rewind selector means. For such an apparatus, it will be merely necessary to reverse the positions of the fast forward selector means 43 and the rewind selector means 41 in the circuit illustrated and described above in connection with FIG. 3. Thus, a play or record operation may be terminated and operation of a fast forward selector means used to operate the signal generating means 71 to apply a location signal 50 to the tape 17 which continues to transport forwardly and wind the tape on the takeup reel. Later, when it is desired to reverse tape feed and relocate the location signal 50, the rewind selector means would be operated to connect the auto search head 45 to the sensing circuit 53. When the location signal 50 is sensed, the stop signal generated by the sensing circuit 53 will be sent to the rewind selector means to stop further tape movement in the rewind direction. A subsequent operation of the play/-record selector means 55 will erase the location signal 50.

A manually operable disabling switch means 99 may be provided for selectively disabling the rewind relay 72, the fast wind relay 79, and play/record relay 86 by opening switch contacts 100 disabling the relays 72, 79 and 86, but still allowing the respective push button 70, 78 and 84 to be operated and cause the usual tape transport and also a playback or recording operation when the push button 84 is operated. When it is desired to provide an automatic marking and searching function, then switch means 99 may be operated to close all of the switch contacts 100 to enable the relays 72, 79 and 86 to function as above described for automatic marking and searching.

Also, a manual operable switch 101 may be provided to allow disconnection of the signal generator 89 and its erasing function when it is desired to provide a series of location signals 50 on the tape at spaced locations as, for example, to mark the location of several subject matters located on the same tape. The fast feed selector means may be used to shift quickly between such location signals 50 which will be automatically sensed and cause automatic stopping at these locations. Similar switch means 99a and 61a function in essentially a similar manner to that described above for the circuit shown in FIG. 4.

From the foregoing, it will be seen that a magnetic tape recording and/or reproducing apparatus has been described with the capability of automatically marking the spot of termination of playback or recording and of automatically returning the spot of the last play or record. The apparatus may use a standard tape format and not require any special operations on the part of the operator either to mark the spot or to return thereto.

While a preferred embodiment has been shown and described, it will be understood that there is no intent to limit the invention by such disclosure but, rather it is intended to cover all modifications and alternate constructions falling within the spirit and scope of the invention as defined in the appended claims.

What is claimed is:

1. An apparatus for automatically marking a spot on a magnetic tape at termination of a playback or recording operation and for subsequently transporting at high speed and returning the magnetic tape at high speed to this spot for resumption of recording and/or reproducing at low speed, said apparatus comprising means carrying a coil of magnetic tape, a transducer means past which said magnetic tape travels for a playback or recording operation, a tape transport means for transporting said tape past said transducer means at a first predetermined low speed and at a second predetermined high speed, play/record selector means for operating said tape transport means to feed said tape in a forward direction at said first predetermined speed and for causing a playback or recording operation a manually operable fast forward selector means for operating said tape transport means to transport said tape in a forward direction at said predetermined speed substantially faster than said first predetermined speed, a manually operable rewind selector means for operating said tape transport means to transport said tape in reverse direction at said second predetermined speed, means for recording activated upon operation of one of said fast forward or rewind selector means for forming a location signal on said magnetic tape at the spot of termination of a playback or recording operation, and sensing means activated by manual operation of the other one of said fast forward or rewind selector means causing tape transport at said high speed for sensing said location signal and for terminating said high speed tape transport so that playback or recording may be resumed at the proximate location of the last playback or recording operation.

2. An apparatus in accordance with claim 1, in which operation of said manually operable fast forward selector means actuates said sensing means, an erasing means is operable to erase said signal from said track, said erasing means being operable by said play/record selector means to erase the signal from said track.

3. An apparatus in accordance with claim 1 in which operation of said manually operable fast forward selector means actuates said sensing means, said means to record a signal on said track comprises a signal generator and further comprises means conditioned by operation of said manually operated rewind selector means to operate said signal generator and apply a signal to said tape.

4. An apparatus in accordance with Claim 1 in which said means for recording the signal on said tape comprises a signal generator for placing a signal on said tape and in which said play/record selector means operates said signal generator to record a continuous signal on said tape until said play/record selector means is disabled, an erasing means for erasing said signal from said track, said rewind selector means operating said erasing means at a predetermined period of time after the operation of said rewind selector means to leave a location signal and to erase the remaining signal applied to the tape during the preceding playback or recording operation.

5. An apparatus for automatically marking a spot on a magnetic tape at termination of a playback or recording and for subsequently transporting and returning the magnetic tape to this spot for resumption of recording and/or reproducing, said apparatus comprising a supply reel for carrying the coil of magnetic tape, a take-up reel for receiving and winding thereon the magnetic tape fed from said supply reel, a transducer means mounted intermediate said supply reel and take-up reel and past which said magnetic tape travels for a playback or recording operation, a tape transport means for transporting said tape from said supply reel to said take-up reel and about said transducer means at a first predetermined speed and at a second speed substantially faster than said first predetermined speed, play/record selector means for operating said tape transport means to feed said tape in a forward direction at said first predetermined speed and for causing a playback or recording operation, a manually operable fast forward selector means for operating said tape transport means to transport said tape in a forward direction at said second speed substantially faster than said first predetermined speed, a manually operable rewind selector means for operating said tape transport means to transport said tape in reverse direction at a said second speed substantially faster than said first predetermined speed, means for forming a location signal on said magnetic tape at the spot of termination of a playback or recording operation with operation of said rewind selector means and sensing means activated by operation of said fast forward selector means for sensing said location signal and for terminating said fast forward tape transport so that playback or recording may be resumed at the proximate location of the last playback or recording.

6. An apparatus for automatically marking the location of termination of a playback or recording operation on a video tape in a video tape recorder, said apparatus comprising a supply means having a pack of video tape thereon, a take-up reel for receiving the video tape fed forwardly thereto, a scanning mechanism for recording on or playbacking from the video tape during its travel from said supply means to said take-up reel, a tape operational velocity for playback or recording and at a second faster velocity for a rewinding or for fast winding operation, a signal generator for generating a signal to be applied to a search track on the video tape, a transducer head means associated with said search track, a play/record selector means for operating said tape transport to transport the video tape at said first operational velocity in a forward direction for causing a playback or recording operation, means actuated upon actuation of said play/record selector means to erase signals from said search track, a manually operable rewind selector means for operating said tape transport at said second faster velocity to transport the video tape in a reverse direction and to unwind tape from said take-up reel, operation of said rewind selector means actuating said signal generator and said transducer head means to apply said location signal to said tape for a predetermined period of time during rewind and to actuate said tape transport to transport said tape at said second faster speed, sensing means for receiving a location signal read from said search track and for terminating said high speed transport, a manually operable fast forward selector means for operating said tape transport to transport said tape forwardly at said faster velocity, operation of said fast forward selector means actuating said sensing means and said transducer head means whereby sensing of said location signal stops said forward tape travel.

7. An apparatus in accordance with claim 6 including a timing means activated upon operation of said rewind selector means to connect said signal generator to said transducer head, an erasing means for applying an erase signal to the tape to erase any prior location signals during rewinding of the tape, said timing means causing said erase means to apply said erase signal after operation of said signal generator for a predetermined period of time.

8. An apparatus in accordance with claim 7 including switch means for disabling said erasing means to leave a plurality of spaced location signals on the tape.

* * * * *